United States Patent
Hirosawa

(10) Patent No.: US 9,983,431 B2
(45) Date of Patent: May 29, 2018

(54) DISPLAY DEVICE WHEREIN A WIDTH CENTER OF A LIGHT-SHIELDING PORTION IS DISPLACED FROM A WIDTH CENTER OF A LIGHT-SHIELDING LAYER PORTION

(71) Applicant: Japan Display Inc., Minato-ku (JP)

(72) Inventor: Jin Hirosawa, Tokyo (JP)

(73) Assignee: Japan Display Inc., Minato-ku (JP)

( * ) Notice: Subject to any disclaimer, the term of this patent is extended or adjusted under 35 U.S.C. 154(b) by 0 days. days.

(21) Appl. No.: 15/442,220

(22) Filed: Feb. 24, 2017

(65) Prior Publication Data

US 2017/0242295 A1 Aug. 24, 2017

(30) Foreign Application Priority Data

Feb. 24, 2016 (JP) ................................. 2016-033014

(51) Int. Cl.
| G02F 1/1335 | (2006.01) |
| G02F 1/1368 | (2006.01) |
| G02F 1/1333 | (2006.01) |
| G02F 1/1362 | (2006.01) |

(52) U.S. Cl.
CPC ...... *G02F 1/133514* (2013.01); *G02F 1/1368* (2013.01); *G02F 1/133345* (2013.01); *G02F 1/136209* (2013.01)

(58) Field of Classification Search
CPC .......... G02F 1/136209; G02F 1/133509; H01J 11/44; H01J 2211/444; H01J 2329/323; H01J 29/327
See application file for complete search history.

(56) References Cited

U.S. PATENT DOCUMENTS

| 2010/0225858 | A1* | 9/2010 | Dong | G02F 1/133512 |
| | | | | 349/106 |
| 2011/0194061 | A1* | 8/2011 | Yoso | G02F 1/1323 |
| | | | | 349/139 |
| 2014/0176885 | A1 | 6/2014 | Okita et al. | |
| 2015/0009439 | A1* | 1/2015 | Morita | G02F 1/134363 |
| | | | | 349/42 |
| 2015/0234243 | A1 | 8/2015 | Oono et al. | |
| 2015/0331280 | A1* | 11/2015 | Wakabayashi | G02F 1/133512 |
| | | | | 349/57 |

FOREIGN PATENT DOCUMENTS

| JP | 2014-126674 | 7/2014 |
| JP | 2014-149444 | 8/2014 |
| JP | 2015-155953 | 8/2015 |

* cited by examiner

*Primary Examiner* — Paul Lee
(74) *Attorney, Agent, or Firm* — Oblon, McClelland, Maier & Neustadt, L.L.P.

(57) ABSTRACT

According to one embodiment, a display device includes a first light-shielding portion and a second light-shielding portion arranged at a first pitch in a first direction, and a light-shielding layer including a first portion overlapping the first light-shielding portion and a second portion overlapping the second light-shielding portion in planar view, a width center of the second light-shielding portion being displaced from a width center of the second portion in the first direction, an opening portion being located between the first portion and the second portion, the first portion and the second portion being arranged at a second pitch different from the first pitch in the first direction.

20 Claims, 11 Drawing Sheets

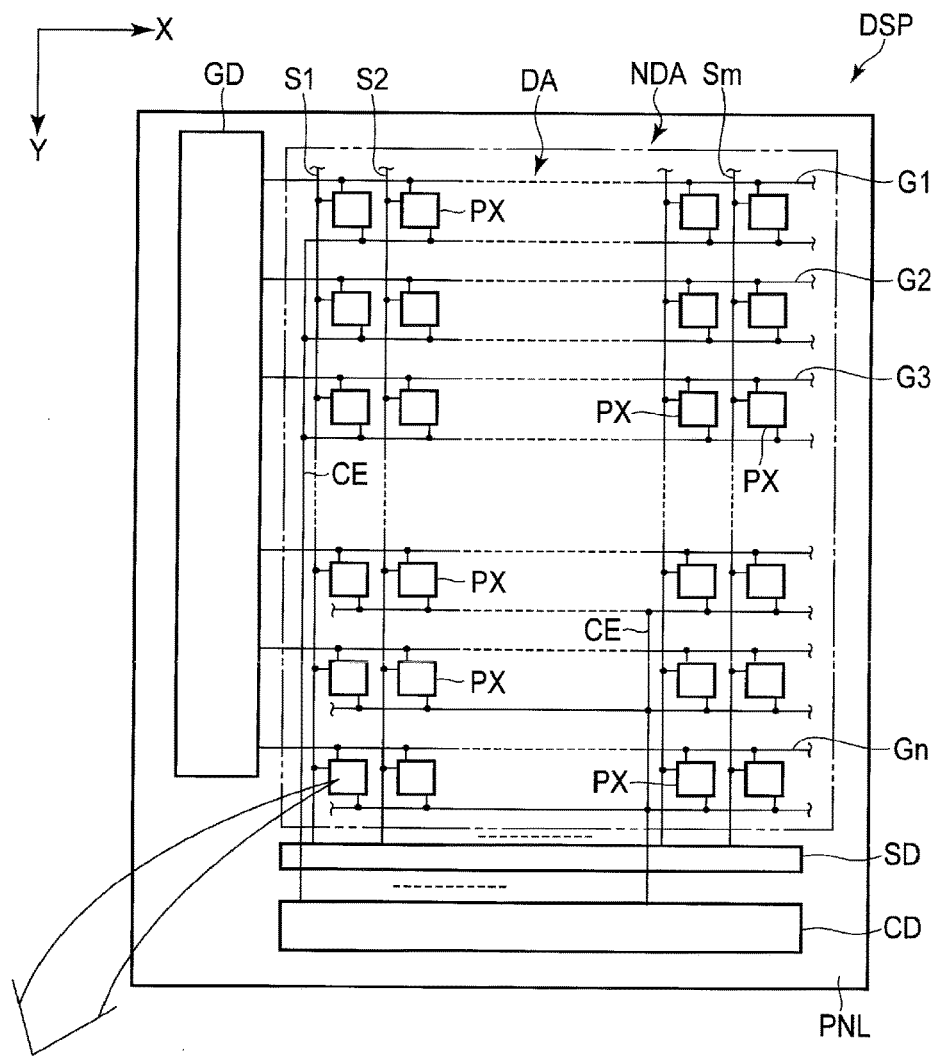
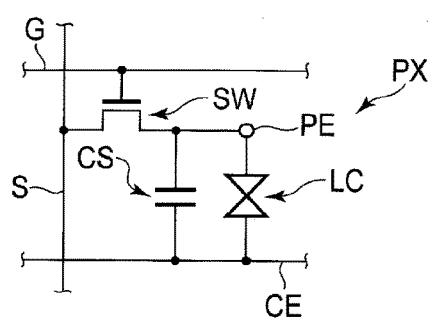
F I G. 2

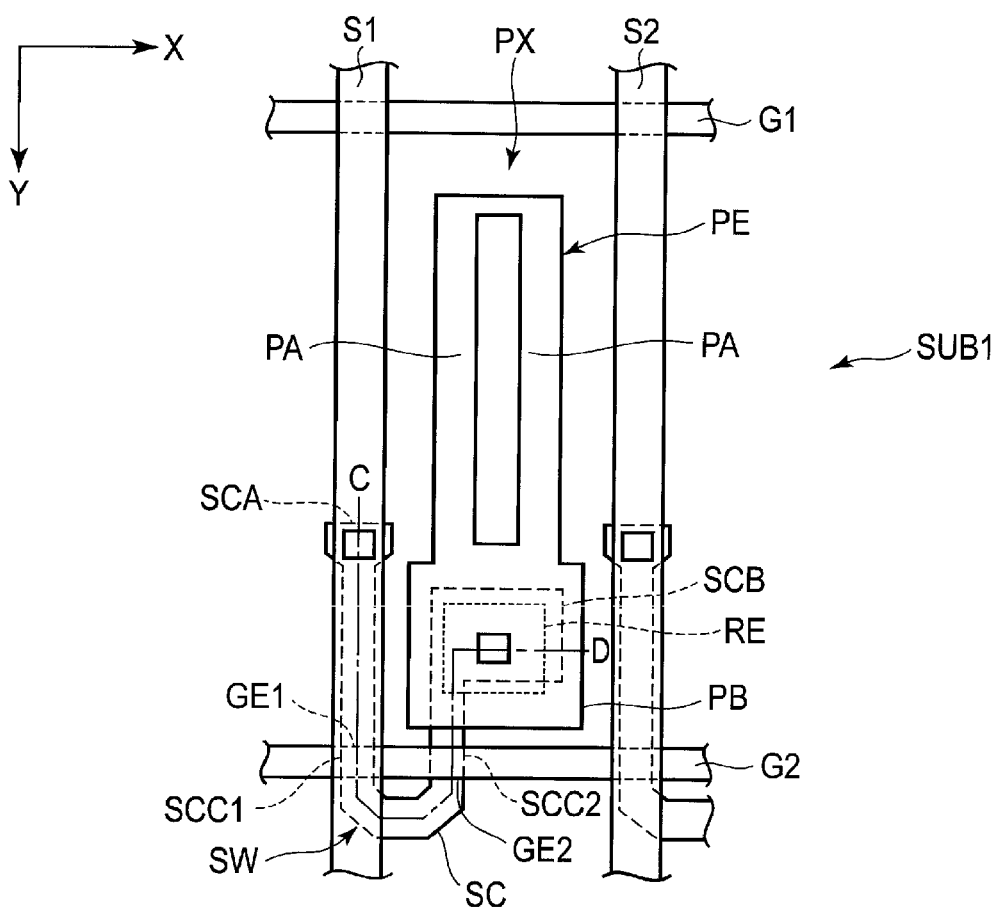
F I G. 5

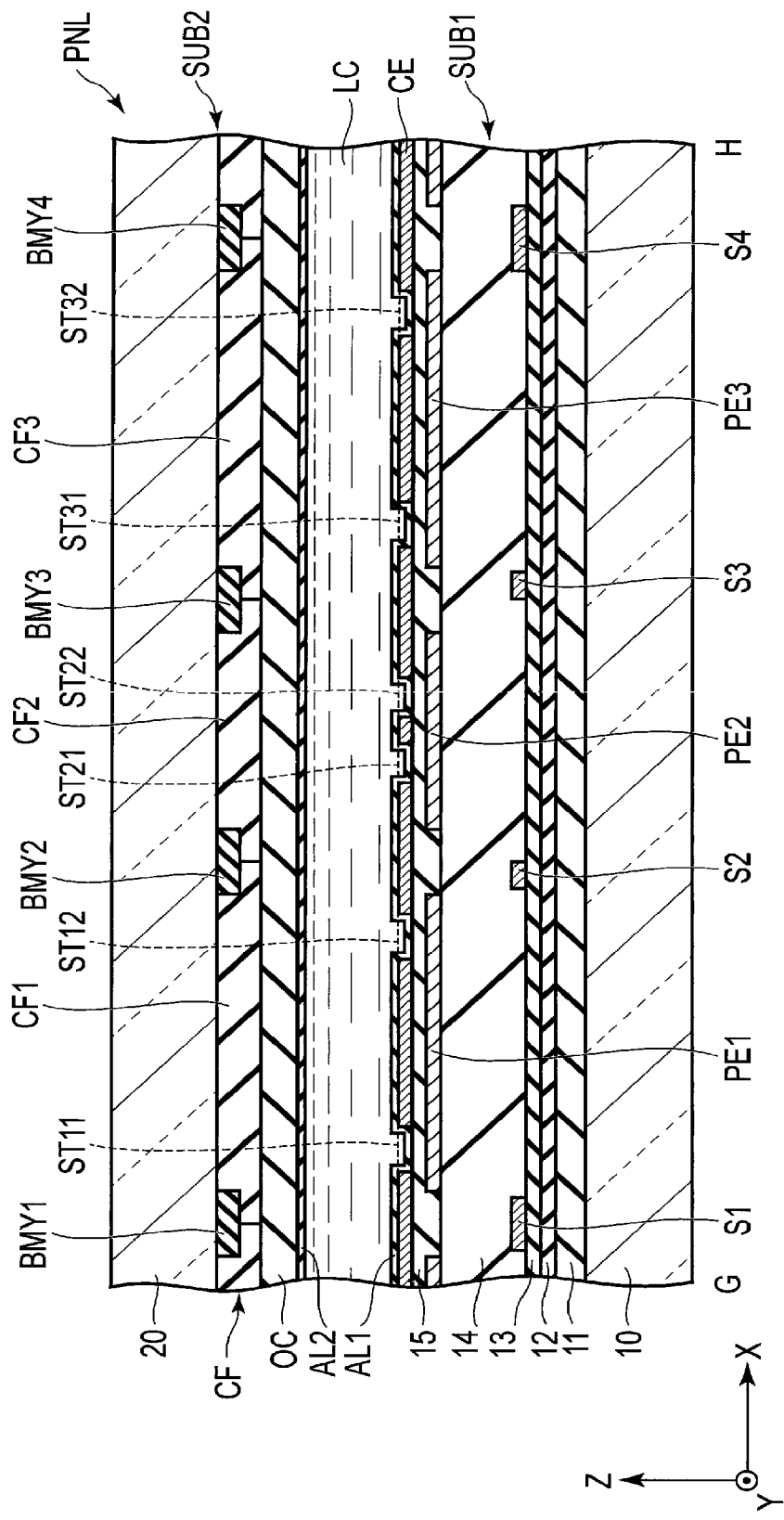
F I G. 11

DISPLAY DEVICE WHEREIN A WIDTH CENTER OF A LIGHT-SHIELDING PORTION IS DISPLACED FROM A WIDTH CENTER OF A LIGHT-SHIELDING LAYER PORTION

CROSS-REFERENCE TO RELATED APPLICATIONS

This application is based upon and claims the benefit of priority from Japanese Patent Application No. 2016-033014, filed Feb. 24, 2016, the entire contents of which are incorporated herein by reference.

FIELD

Embodiments described herein relate generally to a display device.

BACKGROUND

In a display device comprising a pair of substrates opposed to each other, a structure obtained by bonding a substrate on which various signal lines, switching elements, and pixel electrodes are formed, and the other substrate on which a light-shielding layer, and color filters are formed, has been widely adopted. When the display device is observed from an oblique direction angled from its normal direction, color mixing that colors of adjacent pixels are visually mixed or coloring in white display may occur and the display quality may be deteriorated.

Recently, a technology of disposing auxiliary lines opposed to scanning lines and signal lines, a technology of extending a light-shielding layer or signal lines between specific color pixels have been proposed as measures to solve the problems. In addition, small-pitch color pixels are different from large-pitch color pixels with respect to the number of strip electrodes of pixel electrodes, and a technology of extending a width from a pixel electrode end side to a position overlapping a light-shielding layer on the small-pitch color pixels has also been proposed.

BRIEF DESCRIPTION OF THE DRAWINGS

FIG. 2 is an illustration showing a basic configuration and an equivalent circuit, of the display device PNL shown in FIG. 1.

FIG. 5 is a plan view showing a configuration example of a pixel PX in a case where a first substrate SUB1 shown in FIG. 1 is seen from a second substrate side.

FIG. 11 is a cross-sectional view showing the display panel PNL sectioned in line G-H of FIG. 10.

DETAILED DESCRIPTION

Figure 1:
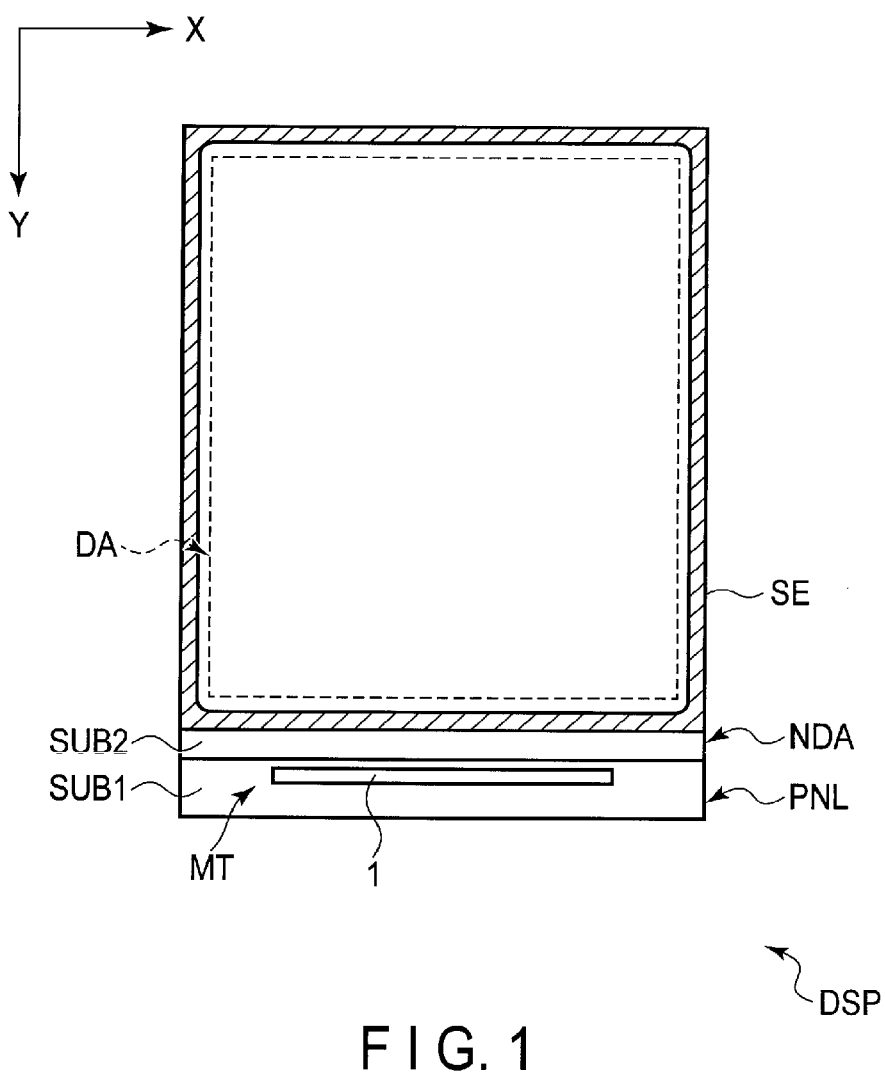
FIG. 1 is an illustration showing a configuration of a display device DSP of the embodiments.

In general, according to one embodiment, a display device, includes: a first substrate including a first light-shielding portion and a second light-shielding portion arranged at a first pitch in a first direction; and a second substrate including a light-shielding layer including a first portion overlapping the first light-shielding portion and a second portion overlapping the second light-shielding portion in planar view, a width center of the second light-shielding portion being displaced from a width center of the second portion in the first direction, an opening portion being located between the first portion and the second portion, the first portion and the second portion being arranged at a second pitch different from the first pitch in the first direction.

According to another embodiment, a display device, includes: a first substrate including first to third light-shielding portions arranged sequentially in a first direction; and a second substrate including a light-shielding layer including a first portion overlapping the first light-shielding portion, a second portion overlapping the second light-shielding portion and a third portion overlapping the third light-shielding portion, in planar view, the first light-shielding portion and the second light-shielding portion being arranged at a first pitch, the first portion and the second portion being arranged at a second pitch larger than the first pitch, the second light-shielding portion and the third light-shielding portion being arranged at a third pitch, the second portion and the third portion being arranged at a fourth pitch smaller than the third pitch.

Embodiments will be described hereinafter with reference to the accompanying drawings. The disclosure is merely an example, and proper changes in keeping with the spirit of the invention, which are easily conceivable by a person of ordinary skill in the art, come within the scope of the invention as a matter of course. In addition, in some cases, in order to make the description clearer, the widths, thicknesses, shapes and the like, of the respective parts are illustrated schematically in the drawings, rather than as an accurate representation of what is implemented. In addition, in the specification and drawings, structural elements equivalent or similar to those described in connection with preceding drawings are denoted by the same reference numbers, and detailed description thereof is omitted unless necessary.

FIG. 1 is an illustration showing a configuration of a display device DSP of the embodiments. A plan view of the display device DSP in an X-Y plane defined by a first direction X and a second direction Y which intersect each other is illustrated here. For example, the first direction X and the second direction Y are orthogonal to each other but may intersect at an angle other than ninety degrees. In the embodiments, a liquid crystal display device is explained as an example of the display device. The major configuration explained in the present embodiment can also be applied to a self-luminous display device comprising an organic electroluminescent display element, and the like, an electronic paper display device comprising an electrophoretic element, and the like, a display device employing micro-electromechanical systems (MEMS), or a display device employing electrochromism.

The display device DSP comprises a display panel PNL, a driver IC chip 1 which drives the display panel PNL, and the like. The display panel PNL is, for example, a liquid crystal display panel and includes a first substrate SUB1, a second substrate SUB2, a sealing member SE and a liquid crystal layer (a liquid crystal layer LC to be explained later). The second substrate SUB2 is opposed to the first substrate SUB1. The first substrate SUB1 and the second substrate SUB2 are bonded by the sealing member SE. The display panel PNL includes a display area DA on which an image is displayed and a frame-shaped non-display area NDA surrounding the display area DA. The display area DA is located on an inner side surrounded by the sealing member SE.

The driver IC chip 1 is located in the non-display area NDA. In the example illustrated, the driver IC chip 1 is mounted on a mounting portion MT of the first substrate SUB1 extending to an outer side than the second substrate SUB2. The driver IC chip 1 incorporates, for example, a display driver which outputs a signal necessary for the image display. The display driver comprises at least several parts of a signal line drive circuit SD, a scanning line drive circuit GD and a common electrode drive circuit CD. The driver IC chip 1 is not limited to the example illustrated but may be mounted on a flexible substrate connected separately to the display panel PNL.

The display panel PNL of the embodiments may be any one of a transmissive display panel having a transmissive display function of displaying an image by allowing the light from a back surface side of the first substrate SUB1 to be selectively transmitted, a reflective display panel having a reflective display function of displaying an image by allowing the light from a front surface side of the second substrate SUB2 side to be reflected selectively, and a transflective display panel having both the transmissive display function and the reflective display function.

FIG. 2 is an illustration showing a basic configuration and an equivalent circuit, of the display device PNL shown in FIG. 1. The display panel PNL includes pixels PX in the display area DA. The pixels PX are arrayed in a matrix. The display panel PNL includes gate lines G (G1 to Gn), signal lines S (S1 to Sm), a common electrode CE and the like in the display area DA. The scanning lines G extend in the first direction X and are arranged in the second direction Y. The signal lines S extend in the second direction Y and are arranged in the first direction X. The scanning lines G and the signal lines S may not extend linearly, but may be partially bent. The common electrode CE is disposed across the pixels PX.

The scanning lines G are connected to the scanning line drive circuit GD. The signal lines S are connected to the signal line drive circuit SD. The common electrode CE is connected to the common electrode drive circuit CD. The signal line drive circuit SD, the scanning line drive circuit GD and the common electrode drive circuit CD may be disposed on the first substrate SUB1 in the non-display area NDA or several parts or all parts of them may be built in the driver IC chip 1 shown in FIG. 1. In addition, the layout of the drive circuits is not limited to the example illustrated but, for example, the scanning line drive circuits GD may be disposed on both sides of the display area DA.

Each pixel PX comprises a switching element SW, a pixel electrode PE, the common electrode CE, a liquid crystal layer LC and the like. The switching element SW is composed of, for example, a thin-film transistor (TFT) and is electrically connected to the gate line G and the signal line S. The scanning line G is connected to the switching elements SW in the respective pixels PX arranged in the first direction X. The signal line S is connected to the switching elements SW in the respective pixels PX arranged in the second direction Y. The pixel electrode PE is electrically connected to the switching element SW. Each pixel electrode PE is opposed to the common electrode CE and drives the liquid crystal layer LC by an electric field generated between the pixel electrode PE and the common electrode CE. A storage capacitor CS is formed, for example, between the common electrode CE and an electrode of the same potential, and between the pixel electrode PE and an electrode of the same potential.

Figure 3:
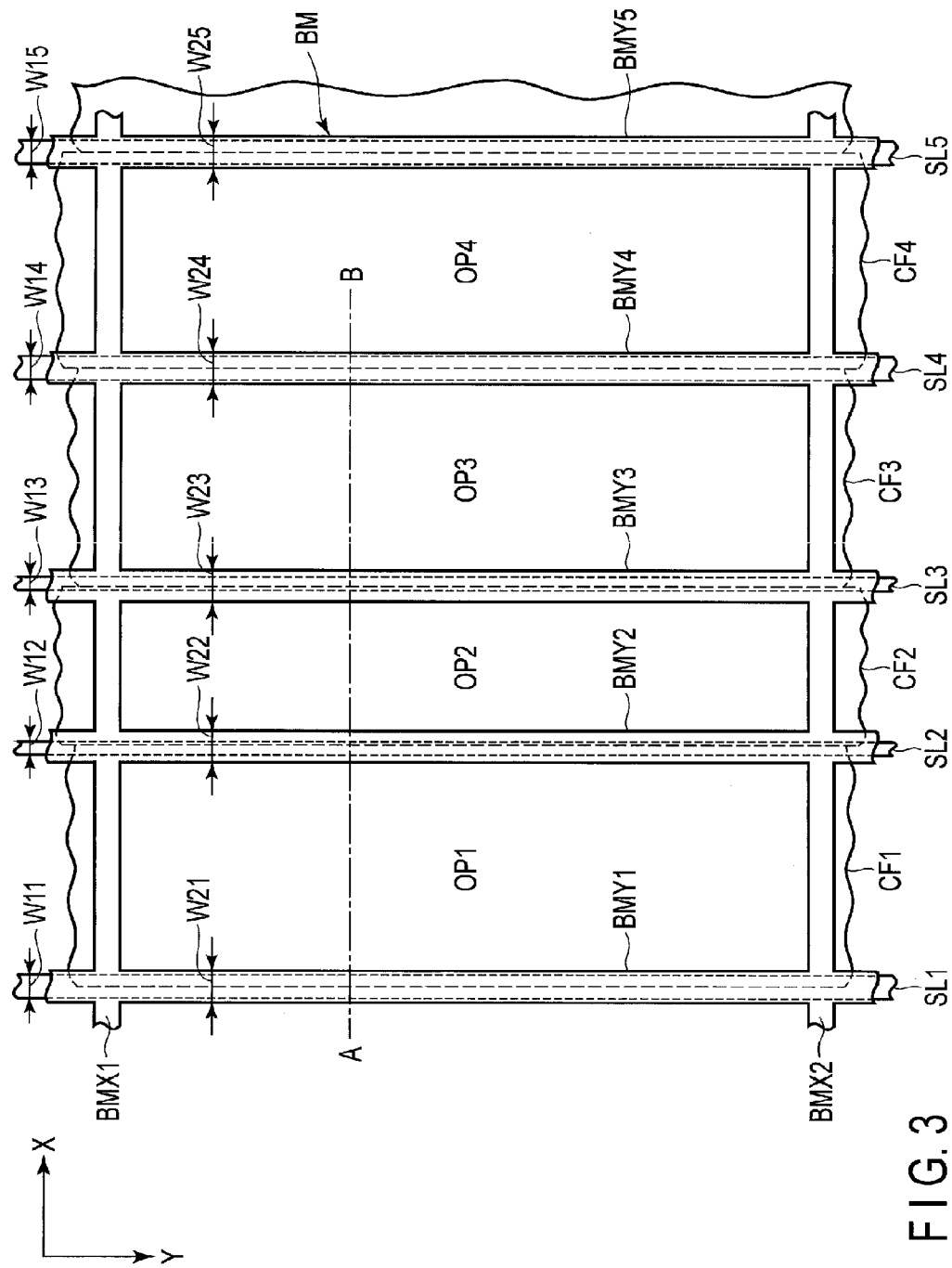
FIG. 3 is a plan view showing a configuration example of light-shielding portions SL1 to SL5 and a light-shielding layer BM.

FIG. 3 is a plan view showing a configuration example of light-shielding portions SL1 to SL5 and a light-shielding layer BM. The plan view in the X-Y plane is illustrated here. The first substrate SUB1 shown in FIG. 1 includes the light-shielding portions SL1 to SL5 and the second substrate SUB2 shown in FIG. 1 includes the light-shielding layer BM.

The light-shielding portions SL1 to SL5 are arranged in the first direction X so as to be spaced apart from each other and extend in the second direction Y. Each of the light-shielding portions SL1 to SL5 is formed in a stripe shape having a substantially constant width in the first direction X. Widths W11, W14 and W15 of the respective light-shielding portions SL1, SL4 and SL5 are equal to each other. Widths W12 and W13 of the respective light-shielding portions SL2 and SL3 are equal to each other. However, the widths W11, W14, and W15 are greater than the widths W12 and W13. The light-shielding portions SL1 to SL5 are formed of a light-shielding member of the first substrate SUB1 and can be formed of, for example, the same material as a lower light-shielding layer, a semiconductor layer, a scanning line, a signal line and the like, which will be explained later.

The light-shielding layer BM is formed in a grating shape, and includes portions BMX1 and BMX2 and portions BMY1 to BMY5 in the example illustrated. The portions BMX1 and BMX2 are arranged in the second direction Y so as to be spaced apart from each other and extend in the first direction X. The portions BMY1 to BMY5 are arranged in the first direction X so as to be spaced apart from each other and extend in the second direction Y. The portions BMX1 and BMX2 are connected to each of the portions BMY1 to BMY5.

Each of the portions BMX1 and BMX2 is formed in a stripe shape having a substantially constant width in the second direction Y. Each of the portions BMY1 to BMY5 is formed in a stripe shape having a substantially constant width in the first direction X. Widths W21 to W25 of the respective portions BMY1 to BMY5 are equal but greater than any one of the widths W11 to W15.

Opening portions OP1 to OP4 are sectioned by the light-shielding layer BM and arranged in the first direction X. The opening portion OP1 is located between the portions BMY1 and BMY2, the opening portion OP2 is located between the portions BMY2 and BMY3, the opening portion OP3 is located between the portions BMY3 and BMY4, and the opening portion OP4 is located between the portions BMY4 and BMY5. The areas of the opening portions OP1, OP3, and OP4 are equal and larger than the area of the opening portion OP2. In the example illustrated, each of the opening portions OP1 to OP4 is shaped in a rectangle having a short side in the first direction X and a long side in the second direction Y but is not limited to the shape illustrated and may be shaped in the other polygon such as a parallelogram.

Color filters CF1 to CF4 are arranged in the first direction X and extend in the second direction Y. Each of the color filters CF1 to CF4 is shaped in a strip having a substantially constant width in the first direction X. The color filters CF1, CF3 and CF4 have equivalent widths, which are larger than the width of the color filter CF2. The color filter CF1 is located between the portions BMY1 and BMY2 and overlaps the opening portion OP1. Similarly to this, the color filter CF2 is located between the portions BMY2 and BMY3 and overlaps the opening portion OP2, the color filter CF3 is located between the portions BMY3 and BMY4 and overlaps the opening portion OP3, and the color filter CF4 is located between the portions BMY4 and BMY5 and overlaps the opening portion OP4. End portions of the color filters CF1 to CF4 overlap the portions BMY1 to BMY5. For example, the color filters CF1 and CF4 are red color filters disposed on red pixels, the color filter CF2 is a green color filter disposed on a green pixel, and the color filter CF3 is a blue color filter disposed on a blue pixel. The opening portions OP1 and OP4 are included in the red pixels, respectively, the opening portion OP2 is included in the green pixel, and the opening portion OP3 is included in the blue pixel. Selection of the colors of the color filters CF1 to CF4 is not limited to the above example. In the example illustrated, for example, a set of the color filters CF1 to CF3 is repeatedly disposed in the first direction X, but the color filter CF4 may be a color filter having a color different from the colors of the color filters CF1 to CF3.

Attention is focused on a positional relationship between the light-shielding portions SL1 to SL5 and the portions BMY1 to BMY5. The light-shielding portions SL1 to SL5 overlap the portions BMY1 to BMY5, respectively, in planar view, and do not overlap the outside of the regions overlapping the portions BMY1 to BMY5, i.e., the opening portions OP1 to OP4. In other words, the entire body of any one of the light-shielding portions SL1 to SL5 overlaps any one of the portions BMY1 to BMY5. The light-shielding portion SL1 is substantially located in the center of the region overlapping the portion BMY1. Similarly to this, the light-shielding portions SL4 and SL5 are substantially located in the center of the regions overlapping the portions BMY4 and BMY5, respectively. In contrast, the light-shielding portion SL2 is located on the side closer to the opening portion OP1 than to the central part (or the side remote from the opening portion OP2), of the region overlaid on the portion BMY2. In addition, the light-shielding portion SL3 is located on the side closer to the opening portion OP3 than to the central part (or the side remote from the opening portion OP2), of the region overlapping the portion BMY3.

Figure 4:
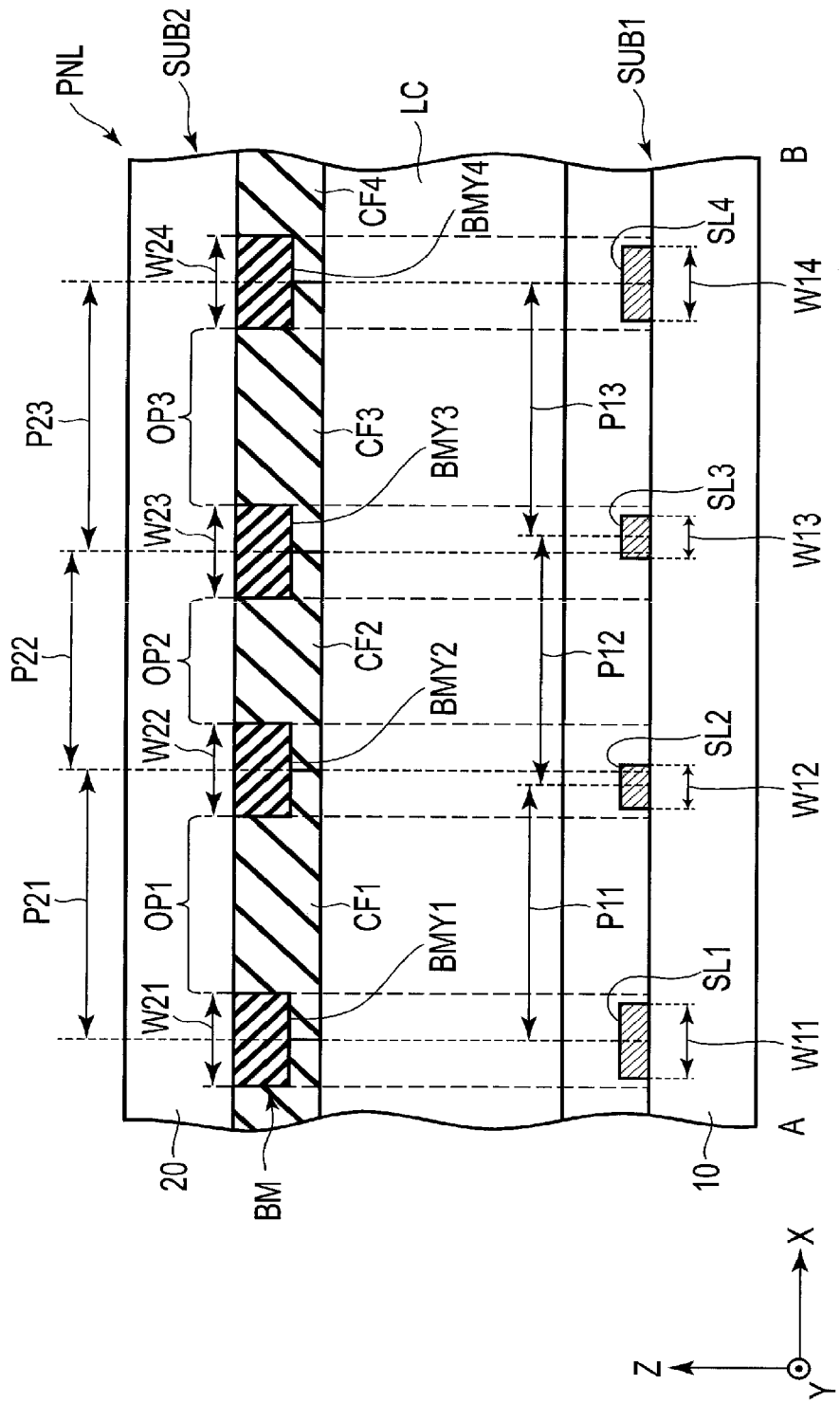
FIG. 4 is a cross-sectional view showing a partial structure of the display panel PNL sectioned in line A-B of FIG. 3.

FIG. 4 is a cross-sectional view showing a partial structure of the display panel PNL sectioned in line A-B of FIG. 3. In the figure, a third direction Z is a direction which intersects the first direction X and the second direction Y. In the present specification, a direction forwarding a tip of an arrow indicating the third direction Z is called an upward direction (or, more simply, upwardly) and a direction forwarding oppositely from the tip of the arrow is called a downward direction (or, more simply, downwardly). In addition, assuming that an observation position for observing the display panel PNL exists on the side of the tip of the arrow indicating the third direction Z and watching the X-Y plane from the observation position is called planar view.

The display panel PNL includes the first substrate SUB1, the second substrate SUB2 and the liquid crystal layer LC. The first substrate SUB1 includes a first insulating substrate 10, the light-shielding layers SL1 to SL4, and the like. The second substrate SUB2 includes a second insulating substrate 20, a light-shielding layer BM, color filters CF1 to CF4 and the like. The portions BMY1 to BMY4 alone of the light-shielding layer BM are illustrated in the figure, but the other portions are located in the same layer. In addition, a detailed cross-sectional structure of the first substrate SUB1 and the second substrate SUB2 will be explained later.

In the first substrate SUB1, the light-shielding layers SL1 and SL2 are arranged at a pitch P11 in the first direction X. Similarly to this, the light-shielding layers SL2 and SL3 are arranged at a pitch P12, and the light-shielding layers SL3 and SL4 are arranged at a pitch P13. In the present specification, the pitch indicates a distance between centers of the members adjacent in the first direction X.

In the present embodiments, the light-shielding portion SL and the portion BMY are, for example, shaped in a line and, the "center" expressed here represents a central position of the trace width of a member including the light-shielding portion SL and the portion BMY and is often called "width center". When a member of interest has a width W along the first direction X in planar view and cross-sectional view, the distance from the center of the member to the one end portion of the member in the first direction X is equal to the distance from the center of the member to the other end portion of the member in the first direction X. Each of the distance between the center and the one end portion and the distance between the center and the other end portion is a half of the width W. For example, the center of the light-shielding portion SL1 is a position in a half distance of the width W11 from the end portion. The center of each member thus indicates "width center" of each member and is hereinafter simply called "center" of each member.

In the second substrate SUB2, the portions BMY1 and BMY2 of the light-shielding layer BM are arranged at a pitch P21 in the first direction X. Similarly to this, the portions BMY2 and BMY3 are arranged at a pitch P22 and the portions BMY3 and BMY4 are arranged at a pitch P23. The pitches P21 and P23 are larger than the pitch P22. For example, when the pitch P22 is assumed to be 1, each of the pitches P21 and P23 is 1.2 times as large, but all the pitches P21 to P23 may be different from each other or equal to each other. The pitch P21 is different from the pitch P11, the pitch P22 is different from the pitch P12, and the pitch P23 is different from the pitch P13. For example, the pitch P21 corresponds to the pitch of the red pixel including the opening portion OP1 and the color filter CF1, the pitch P22 corresponds to the pitch of the green pixel including the opening portion OP2 and the color filter CF2, and the pitch P23 corresponds to the pitch of the blue pixel including the opening portion OP3 and the color filter CF3.

First, attention is focused on a relationship between the light-shielding portions SL1 and SL2, and the portions BMY1 and BMY2, which are adjacent to sandwich the opening portion OP1. The positions of the centers of the light-shielding portion SL1 and the portion BMY1 in the first direction X match each other. The center of the light-shielding portion SL2 is displaced toward the side closer to the opening portion OP1 than to the center of the portion BMY2. For this reason, the pitch P11 is smaller than the pitch P21. In addition, a width W11 of the light-shielding portion SL1 is larger than a width W12 of the light-shielding portion SL2. According to this configuration, the gap between the light-shielding portions SL1 and SL2 can be made smaller as compared with a configuration in which the light-shielding portions SL1 and SL2 are arranged at the pitch P21 or a configuration in which each of the light-shielding portions SL1 and SL2 has the width W12. A relationship between the light-shielding portions SL3 and SL4, and the portions BMY3 and BMY4, which are adjacent to sandwich the opening portion OP3, is also similar to the relationship between the light-shielding portions SL1 and SL2 and the portions BMY1 and BMY2, and the pitch P13 is smaller than the pitch P23 and the width W14 is larger than the width W13.

In contrast, attention is focused on a relationship between the light-shielding portions SL2 and SL3, and the portions BMY2 and BMY3, which are adjacent to sandwich the opening portion OP2. The center of the light-shielding portion SL2 is displaced toward one of the sides remoter from the opening portion OP2 than from the center of the portion BMY2 (or the side close to the opening portion OP1). The center of the light-shielding portion SL3 is displaced toward the other side remoter from the opening portion OP2 than from the center of the portion BMY3 (or the side close to the opening portion OP3). For this reason, the pitch P12 is larger than the pitch P22. In addition, the width W12 of the light-shielding portion SL2 is equal to the width W13 of the light-shielding portion SL13. According to this configuration, the gap between the light-shielding portions SL2 and SL3 can be made larger as compared with a configuration in which the light-shielding portions SL2 and SL3 are arranged at the pitch P22 or a configuration in which at least one of the light-shielding portions SL2 and SL3 has the width W11.

When the gap between the light-shielding portions is formed, the width W11 can be expanded in a range of not exceeding the width W21 since the width W21 of the portion BMY1 is larger than the width W11 of the light-shielding portion SL1. In addition, the light-shielding portion SL2 can be displaced toward the opening portion OP1 in a range in which the entire body of the light-shielding portion SL2 is overlaid on the portion BMY2 since the width W22 of the portion BMY2 is larger than the width W12 of the light-shielding portion SL2. In addition, the light-shielding portion SL3 can be displaced toward the opening portion OP3 in a range in which the entire body of the light-shielding portion SL3 is overlaid on the portion BMY3 since the width W23 of the portion BMY3 is larger than the width W13 of the light-shielding portion SL3. For example, an amount of displacement between the center of the light-shielding portion SL3 and the center of the portion BMY3 is (W23−W13)/2 or less.

In the display device having the above configuration, the areas of the opening portions of the respective color pixels and the hue of the color filters are set to implement optimum white display when the display device is observed from, for example, a frontal direction (third direction Z in the figure). In contrast, when the display device is observed from an oblique direction angled from the frontal direction, undesirable coloring often occurs at the white display due to a difference in optical property and the like from the case where the display device is observed from the frontal direction. In particular, in the pixel configuration in which the pitches of the color pixels are different as shown in FIG. 4, an area ratio of opening portions between the first color pixel having a large pitch and the second color pixel having a small pitch is varied in the case where the display device is observed from the frontal direction and the case where the display device is observed from the oblique direction. When the display device is observed from the oblique direction, reduction in area at the opening portion of the second pixel is more remarkable than that of the first color pixel. As a result, the color component of the first color pixel contributes more to the display than the color component of the second color pixel, and the white balance is lost. For example, in the pixel configuration in which the green pixel corresponds to the second color pixel having a small pitch and the red pixel and the blue pixel correspond to the first pixels having large pitches, although white is exhibited, violet is often recognized visually, since the green component is reduced and the red and blue color components are increased when the display device is observed from the oblique direction.

According to the present embodiments, the pitches of the light-shielding portions SL disposed on the first substrate SUB1 are different from the pitches of the light-shielding portions SL of the light-shielding layer BM disposed on the second substrate SUB2.

For example, the pitches of the light-shielding portions SL are smaller than the pitches of the portions BMY, at the first color pixel (red and blue color pixels in the above example) in which the color component tends to be increased when the display device is observed from the oblique direction. In addition, the width of one of the adjacent light-shielding portions SL is larger than the width of the other. For this reason, an amount of the light of the first color pixel transmitted through the first substrate SUB1 is reduced, at the oblique observation angle, and the color component contributing to the display can be reduced at the first color pixel. Coloring which occurs in accordance with increase in the color component of the first color pixel can be thereby suppressed even when the display device is observed from the oblique direction. As the light-shielding portion SL for reducing the amount of the light transmitted through the first substrate SUB1, at the first color pixel, is remote from the first insulating substrate 10 toward the second substrate SUB2, the width of the portion needs to be increased. For this reason, when the increase in width of the light-shielding portion SL is unallowable, the light-shielding portion SL is desirably disposed at a position close to the first insulating substrate 10.

In addition, the pitches of the light-shielding portions SL are larger than the pitches of the portions BMY, at the second color pixel (green pixel in the above example) in which the color component tends to be decreased when the display device is observed from the oblique direction. For this reason, the amount of the light of the second color pixel transmitted through the first substrate SUB1 is increased, at the oblique observation angle, and the color component contributing to the display can be increased at the second color pixel. Coloring which occurs in accordance with decrease in the color component of the second color pixel can be thereby suppressed even when the display device is observed from the oblique direction.

Deterioration in display quality at the oblique observation angle can be therefore suppressed.

The above effect is not limited to the pixel configuration in which the pitches of the color pixels are different. For example, when a specific color component is increased or decreased due to the difference in optical property between the color filters when the display device is observed from the oblique direction, in the pixel configuration in which the color pixels arranged in the first direction X are disposed at regular pitches, too, the same effect as the above-explained effect can be obtained by employing the configuration of the first color pixel or the configuration of the second color pixel.

In any of the cases, the light-shielding portion SL definitely does not extend from the portion BMY of the light-shielding layer BM in planar view. For this reason, optimum white balance can be obtained without reducing the area of the opening portion by the light-shielding portion when the display device is observed from the frontal direction. For example, when a difference of color chromaticity in the case observing the display device of the present embodiments from the oblique direction (i.e., a direction angled at forty-five degrees from the third direction Z) from the color chromaticity in the case observing the display device from the frontal direction was measured, Δx was ±0.001 or less and Δy was −0.010 or less as coordinate values on the xy chromaticity diagram (CIE1931 chromaticity diagram).

Next, a specific configuration example of the display device of the present embodiments will be explained.

FIG. 5 is a plan view showing a configuration example of a pixel PX in a case where a first substrate SUB1 shown in FIG. 1 is seen from a second substrate side. The example illustrated corresponds to an example employing a fringe field switching (FFS) mode which is one of the display modes using the lateral electric field.

The first substrate SUB1 includes scanning lines G1 and G2, signal lines S1 and S2, a switching element SW, a pixel electrode PE and the like. For example, the first substrate SUB1 includes a common electrode, which is not illustrated in the figure.

The scanning lines G1 and G2 are disposed to be spaced apart from each other in the second direction Y and extend in the first direction X. The signal lines S1 and S2 are disposed to be spaced apart from each other in the first direction X and extend in the second direction Y. In the example illustrated, the pixel PX corresponds to a box-shaped region defined by the scanning lines G1 and G2 and the signal lines S1 and S2, and is shaped in a rectangle having a length in the first direction X smaller than a length in the second direction Y. The shape of the pixel PX is not limited to a rectangle but can be arbitrarily changed.

The switching element SW is electrically connected with the scanning line G2 and the signal line S1. In the example illustrated, the switching element SW has a double-gate structure. The switching element SW comprises a semiconductor layer SC and a relay electrode RE. The semiconductor layer SC is disposed to have a part overlaid on the signal line S1, and the other part extends between the signal lines S1 and S2 to be substantially shaped in letter U. The semiconductor layer SC includes a channel region SCC1 intersecting the scanning line G2 in a region overlaid on the signal line S1, and a channel region SCC2 intersecting the scanning line G2 in a region between the signal lines S1 and S2. The regions of the scanning line G2 overlaid on the channel regions SCC1 and SCC2 function as gate electrodes GE1 and GE2, respectively. The semiconductor layer SC has one end portion SCA electrically connected to the source line S1 and the other end portion SCB electrically connected to the relay electrode RE. The relay electrode RE is formed in an insular shape and disposed between the scanning lines G1 and G2 and between the signal lines S1 and S2.

The pixel electrode PE is disposed between the scanning lines G1 and G2 and between the signal lines S1 and S2. The pixel electrode PE comprises a main electrode portion PA and a contact portion PB. The main electrode portion PA and a contact portion PB are formed integrally or sequentially and are electrically connected to each other. The pixel electrode PE illustrated in the figure comprises two main electrode portions PA extending from the contact portion PB to the scanning line G1. The main electrode portions PA extend linearly in the second direction Y. Two main electrode portions PA are arranged in the first direction X to be spaced apart from each other, and formed in a strip shape having substantially the same width in the first direction X. The contact portion PB is disposed at a position overlaid on the relay electrode RE and is electrically connected with the relay electrode RE. The pixel electrode PE is thereby electrically connected with the switching element SW. The shape of the pixel electrode PE is not limited to the example illustrated but can be arbitrarily changed in accordance with the shape of the pixel PX.

Figure 6:
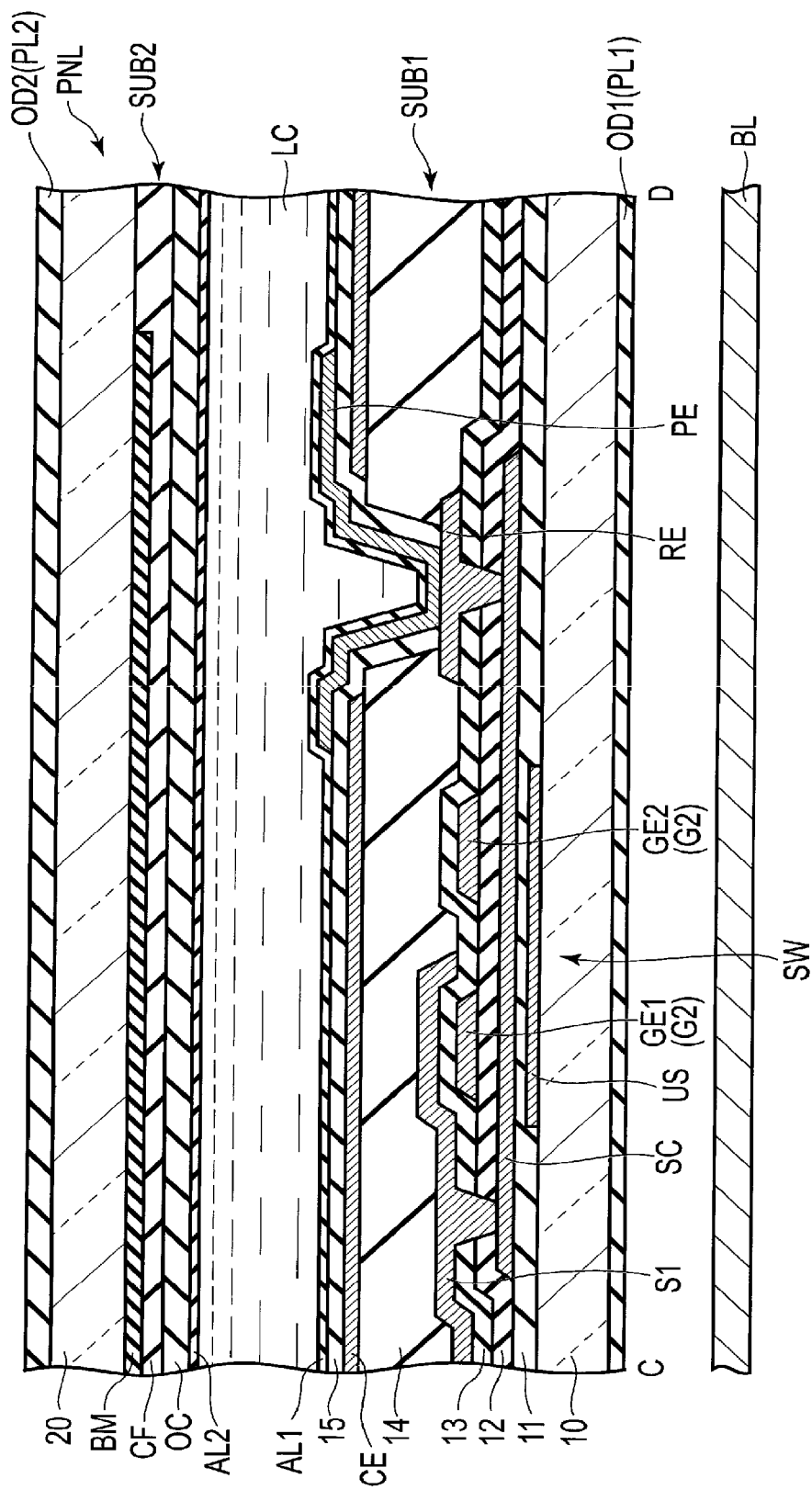
FIG. 6 is a cross-sectional view showing a partial structure of the display panel PNL sectioned in line C-D of FIG. 5.

FIG. 6 is a cross-sectional view showing a partial structure of the display panel PNL sectioned in line C-D of FIG. 5.

The first substrate SUB1 includes a first insulating substrate 10, a first insulating film 11, a second insulating film 12, a third insulating film 13, a fourth insulating film 14, a fifth insulating film 15, a lower light-shielding layer US, a semiconductor layer SC, the scanning line G2, the signal line S1, the relay electrode RE, the common electrodes CE, the pixel electrode PE, the first alignment film AL1 and the like.

The first insulating substrate 10 is a substrate having a light transmitting property such as a glass substrate or a resin substrate. The lower light-shielding layer US is located on the first insulating substrate 10 and is covered with the first insulating film 11. The lower light-shielding layer US blocks the light traveling from the backlight unit BL to the semiconductor layer SC. The semiconductor layer SC is located on the first insulating film 11 and is covered with the second insulating film 12. The semiconductor layer SC is formed of, for example, polycrystalline silicon but may be formed of amorphous silicon, an oxide semiconductor or the like.

The gate electrodes GE1 and GE2 which are parts of the scanning line G2 are located on the second insulating film 12 and covered with the third insulating film 13. The scanning line G1 (not shown) is also disposed in the same layer as the scanning line G2. The scanning line G2 is formed of a metal material such as aluminum (Al), titanium (Ti), silver (Ag), molybdenum (Mo), tungsten (W), copper (Cu) and chromium (Cr) or an alloy formed in a combination of these metal materials, and the like, and may be formed in a single-layer structure or a multi-layer structure. The lower light-shielding layer US is desirably located just under the semiconductor layer SC at the positions opposed to the gate electrodes GE1 and GE2.

The signal line S1 and the relay electrode RE are located on the third insulating film 13 and are covered with the fourth insulating film 14. The signal line S2 (not shown) is also disposed in the same layer as the signal line S1. The signal line S1 and the relay electrode RE can be formed of the same material, and the above metal materials can be used for the formation. The signal line S1 is in contact with the semiconductor layer SC through a contact hole which penetrates the second insulating film 12 and the third insulating film 13. The relay electrode RE is in contact with the semiconductor layer SC through a contact hole which penetrates the second insulating film 12 and the third insulating film 13.

The common electrode CE is located on the fourth insulating film 14 and covered with the fifth insulating film 15. The pixel electrode PE is located on the fifth insulating film 15 and covered with the first alignment film AL1. The pixel electrodes PE is partially opposed to the common electrode CE via the fifth insulating film 15. The common electrode CE and the pixel electrode PE are formed of a transparent conductive material such as indium-tin-oxide (ITO) or indium-zinc-oxide (IZO). The pixel electrode PE is in contact with the relay electrode RE through a contact hole which penetrates the fourth insulating film 14 and the fifth insulating film 15, at a position overlaid on the opening portion of the common electrode CE.

The first insulating film 11, the second insulating film 12, the third insulating film 13 and the fifth insulating film 15 are formed of an inorganic insulating material such as a silicon oxide, a silicon nitride or a silicon oxynitride and may be formed in a single-layer structure or a multi-layer structure. The fourth insulating film 14 is an organic insulating film formed of acrylic resin or the like.

The second substrate SUB2 includes a second insulating substrate 20, the light-shielding layer BM, a color filter CF, an overcoat layer OC, a second alignment film AL2, and the like.

The second insulating substrate 20 is a substrate having a light transmitting property such as a glass substrate or a resin substrate. The light-shielding layer BM and the color filter CF are located on a side of the second insulating substrate 20, which is opposed to the first substrate SUB1. The light-shielding layer BM is formed in a grating shape as explained above and partitions the pixels. For example, the light-shielding layer BM is disposed at a position opposed to each of the line portions such as the signal lines S1 and S2, the scanning lines G1 and G2, and the like. The color filter CF is formed on a position opposed to the pixel electrode PE, and is partially overlaid on the light shielding layer BM. The overcoat layer OC covers the color filter CF. The second alignment film AL2 covers the overcoat layer OC.

The color filter CF may be disposed on the first substrate SUB1. The light-shielding layer BM may be disposed between the color filter CF and the overcoat layer OC or between the overcoat layer OC and the second alignment film AL2. In addition, two or more color filters having different colors overlaid to reduce the transmittance may function as a light-shielding layer instead of disposing the light-shielding layer BM. Alternatively, a pixel exhibiting a white color may be added, a white color filter or an uncolored resin material may be disposed on the white pixel, or not the color filter but the overcoat layer OC may be disposed. The color filter is not disposed in a display device of a monochromatic display type.

The above-explained first substrate SUB1 and second substrate SUB2 are disposed such that the first alignment film AL1 and the second alignment film AL2 are opposed to each other. A spacer is formed of a resin material and disposed between the first substrate SUB1 and the second substrate SUB2, although not illustrated in the figure. The spacer is formed on one of the first substrate SUB1 and the second substrate SUB2 and is in contact with the other substrate. A predetermined cell gap is thereby formed between the first alignment film AL1 and the second alignment film AL2. Besides the spacer forming the cell gap, however, a sub-spacer which is not in contact with the other substrate in a stationary state in which an external stress is not applied to the display panel may be included. The cell gap is, for example, 2 to 5 μm. The first substrate SUB1 and the second substrate SUB2 are bonded to each other with a sealing member in a state in which the predetermined cell gap is formed.

The liquid crystal layer LC is located between the first substrate SUB1 and second substrate SUB2 and held between the first alignment film AL1 and the second alignment film AL2. The liquid crystal layer LC includes liquid crystal molecules. The liquid crystal layer LC is formed of a liquid crystal material of a positive type (positive dielectric anisotropy) or a negative type (negative dielectric anisotropy).

A first optical element OD1 comprising a first polarizer PL1 is disposed under the first substrate SUB1 with respect to the display panel PNL having the above configuration. In addition, a second optical element OD2 comprising a second polarizer PL2 is disposed above the second substrate SUB2. For example, the first polarizer PL1 and the second polarizer PL2 are disposed such that their absorption axes are orthogonal to each other in the X-Y plane. Each of the first optical element OD1 and the second optical element OD2 may comprise a retardation plate such as a quarter-wave plate or a half-wave plate, a scattering layer, an antireflective layer and the like as needed.

In this configuration example, the liquid crystal molecules contained in the liquid crystal layer LC are subjected to initial alignment in a predetermined direction between the first alignment film AL1 and the second alignment film AL2, in an OFF state in which an electric field is not formed between the pixel electrode PE and the common electrode CE. In such an OFF state, the light emitted from the backlight unit BL toward the display panel PNL is absorbed by the first optical element OD1 and the second optical element OD2 to execute dark display. In contrast, in an ON state in which an electric field is formed between the pixel electrode PE and the common electrode CE, the liquid crystal molecules are aligned in a direction different from the initial alignment direction by the electric field and the alignment direction is controlled by the electric field. In such an ON state, the light emitted from the backlight unit BL is partially transmitted through the first optical element OD1 and the second optical element OD2 to execute bright display.

Next, a case where the signal lines S1 to S4 function as the light-shielding portions SL1 to SL4, respectively, in the above specific configuration example, will be explained.

Figure 7:
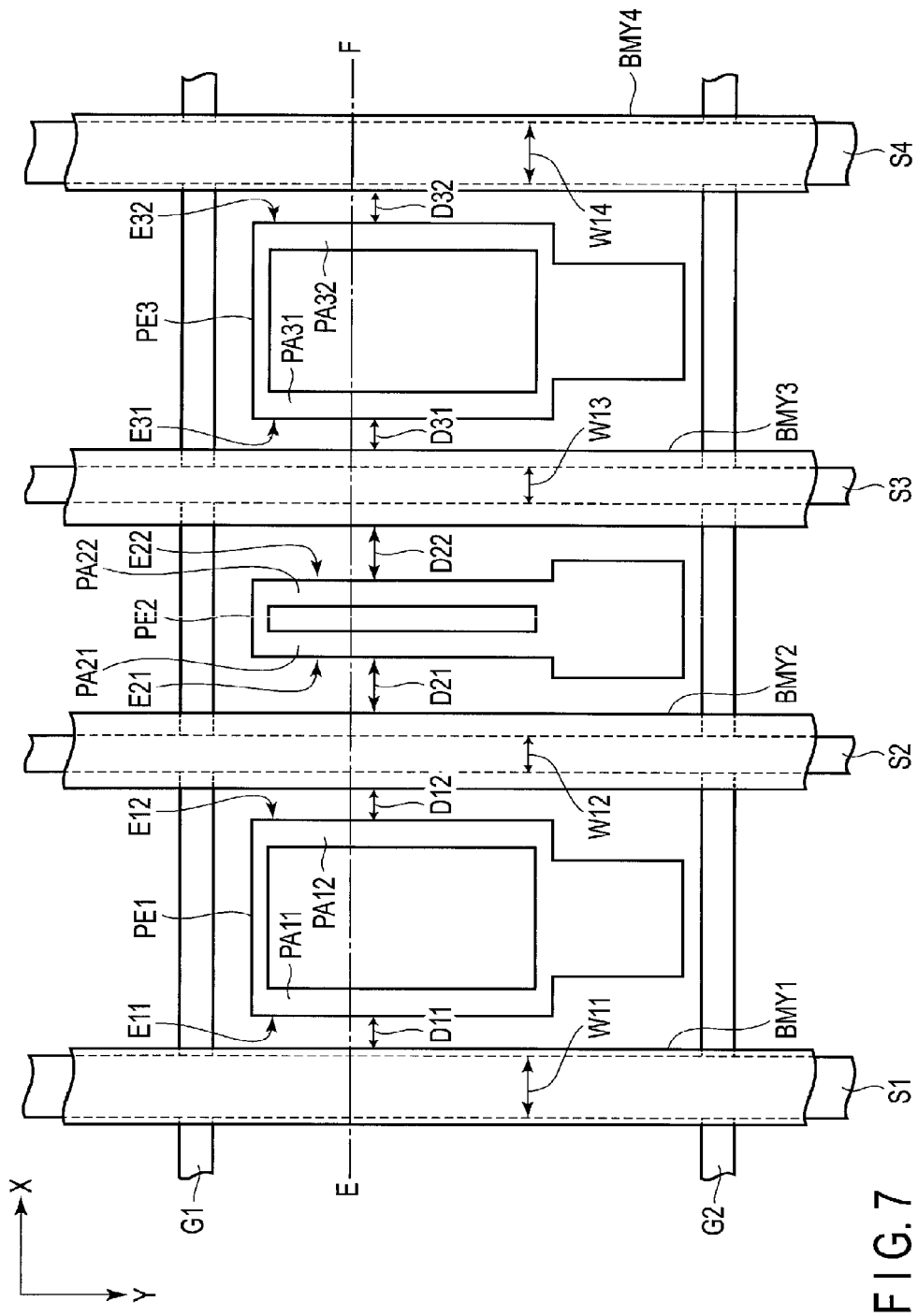
FIG. 7 is a plan view showing a configuration example of major portions of a first substrate and a light-shielding layer BM of a second substrate.

FIG. 7 is a plan view showing a configuration example of major portions of the first substrate and the light-shielding layer BM of the second substrate. A portion of the light-shielding layer BM extending in the first direction X is not illustrated in the figure.

The signal lines S1 and S4 are arranged in the first direction X so as to be spaced apart from each other and extend in the second direction Y. The signal lines S1 and S4 have equal widths W11 and W14, respectively. The signal lines S2 and S3 have equal widths W12 and W13, respectively. The widths W11 and W14 are larger than the widths W12 and W13. Each of the signal lines S1 to S4 may be formed in a strip shape having a substantially constant width in the first direction X or a width between the signal lines (or a width of a part adjacent to the pixel electrode) may be formed to be larger than the width of a part intersecting the scanning lines. This width corresponds to a maximum width of each of the signal lines S1 to S4 (or the width of the part adjacent to the pixel electrode).

The portions BMY1 to BMY4 of the light-shielding layer BM overlap the signal lines S1 to S4, respectively, in planar view. More specifically, the signal line S1 is substantially located in the center of a region overlaid on the portion BMY1. The signal line S4 is substantially located in the center of a region overlapping the portion BMY4. The signal line S2 is located on the side closer to the signal line S1 than to the central part (or the side remote from the signal line S3), of the region overlapping the portion BMY2. The signal line S3 is located on the side closer to the signal line S4 than to the central part (or the side remote from the signal line S2), of the region overlapping the portion BMY3.

The pixel electrodes PE1 to PE3 comprise the same number of electrode portions. In the example illustrated, the pixel electrodes PE1 to PE3 comprise electrode portions PA11 and PA12, electrode portions PA21 and PA22, and electrode portions PA31 and PA32, respectively. A pitch between the electrode portions PA11 and PA12 in the first direction X is equal to a pitch between the electrode portions PA31 and PA32 in the first direction X and is larger than a pitch between the electrode portions PA21 and PA22 in the first direction X.

The pixel electrode PE1 is located between the portions BMY1 and BMY2 or between the signal lines S1 and S2. The pixel electrode PE1 comprises an end portion (in an outer periphery of the electrode portion PA11) E11 located on the side adjacent to the portion BMY1 and the other end portion (in an outer periphery of the electrode portion PA12) E12 located on the side adjacent to the portion BMY2. A distance D11 between the portion BMY1 and the end portion E11 is equal to a distance D12 between the portion BMY2 and the end portion E12.

The pixel electrode PE2 is located between the portions BMY2 and BMY3 or between the signal lines S2 and S3. The pixel electrode PE2 comprises an end portion (in an outer periphery of the electrode portion PA21) E21 located on the side adjacent to the portion BMY2 and the other end portion (in an outer periphery of the electrode portion PA22) E22 located on the side adjacent to the portion BMY3. A distance D21 between the portion BMY2 and the end portion E21 is equal to a distance D22 between the portion BMY3 and the end portion E22. However, the distances D11 and D12 are smaller than the distances D21 and D22.

The pixel electrode PE3 is located between the portions BMY3 and BMY4 or between the signal lines S3 and S4. The pixel electrode PE3 comprises an end portion (in an outer periphery of the electrode portion PA31) E31 located on the side adjacent to the portion BMY3 and the other end portion (in an outer periphery of the electrode portion PA32) E32 located on the side adjacent to the portion BMY4. A distance D31 between the portion BMY3 and the end portion E31 is equal to a distance D32 between the portion BMY4 and the end portion E32. The distances D31 and D32 are equal to the distances D11 and D12.

Figure 8:
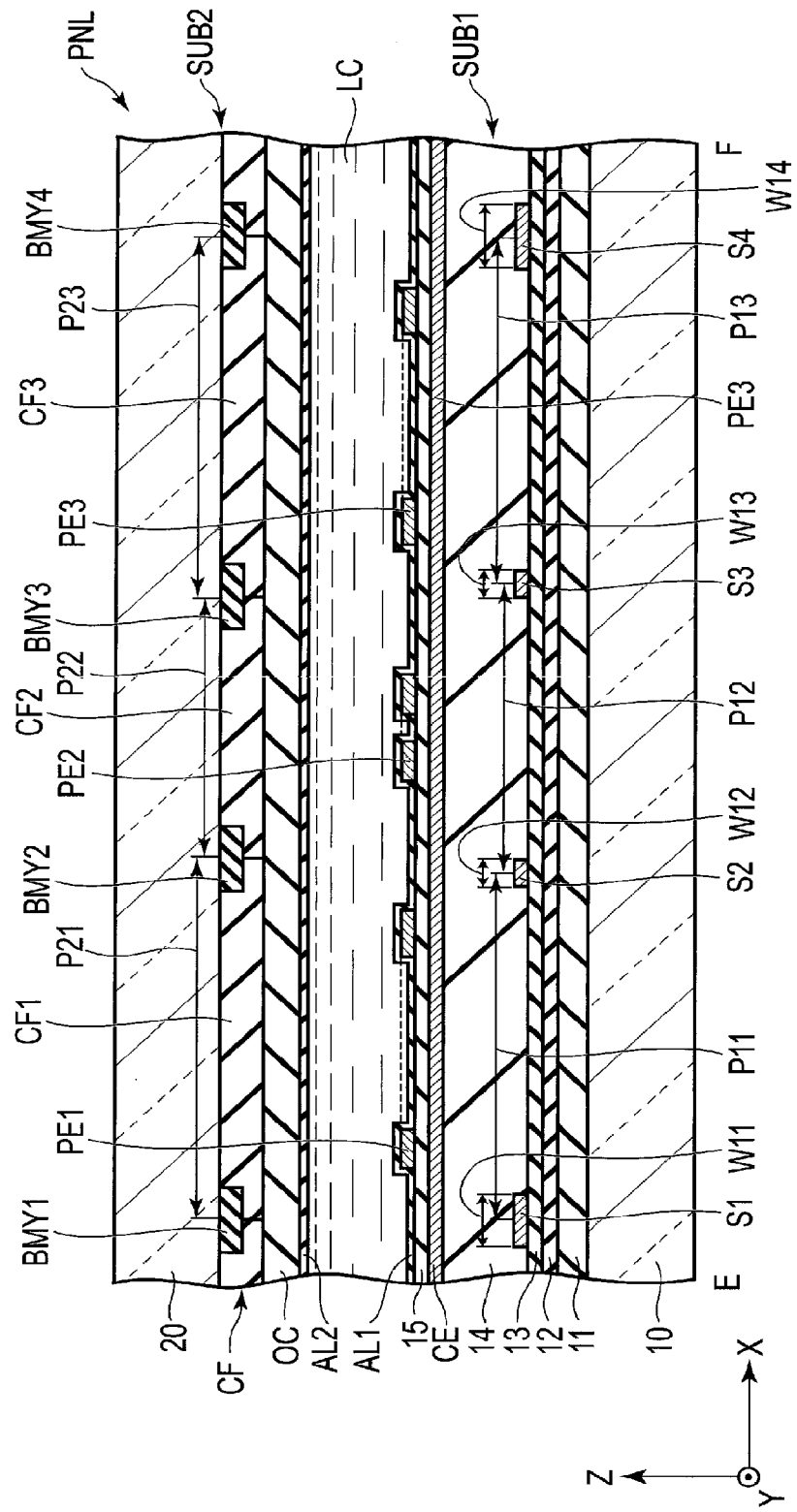
FIG. 8 is a cross-sectional view showing a display panel PNL sectioned in line E-F of FIG. 7.

FIG. 8 is a cross-sectional view showing the display panel PNL sectioned in line E-F of FIG. 7. In the first substrate SUB1, the signal lines S1 to S4 are located on the third insulating film 13 and covered with the fourth insulating film 14. As explained with reference to FIG. 6, the semiconductor layer SC is located between the first insulating film 11 and the second insulating film 12, and the signal lines S1 to S4 are located between the semiconductor layer SC and the second substrate SUB2. The signal lines S1 and S2 are arranged at the pitch P11, the signal lines S2 and S3 are arranged at the pitch P12, and the signal lines S3 and S4 are arranged at the pitch P13. In the second substrate SUB2, the portions BMY1 and BMY2 are arranged at the pitch P21, the portions BMY2 and BMY3 are arranged at the pitch P22, and the portions BMY3 and BMY4 are arranged at the pitch P23.

Attention is focused on a relationship between the signal lines S1 and S2, and the portions BMY1 and BMY2, which are adjacent to sandwich the pixel electrode PE1, similarly to the explanation referring to FIG. 4. The positions of the centers of the signal line S1 and the portion BMY1 in the first direction X match each other. The center of the signal line S2 is displaced toward the side closer to the pixel electrode PE1 than to the center of the portion BMY2. For this reason, the pitch P11 is smaller than the pitch P21. In addition, the signal line S1 is wider than the signal line S2. According to this configuration example, the gap between the signal lines S1 and S2 can be made smaller as compared with the configuration in which the signal lines S1 and S2 are arranged at the pitch P21 and the configuration in which each of the signal lines S1 and S2 has the width W12. A relationship between the light-shielding portions SL3 and SL4, and the portions BMY3 and BMY4, which are adjacent to sandwich the pixel electrode PE3, is also similar to the relationship between the signal lines S1 and S2 and the portions BMY1 and BMY2, and the pitch P13 is smaller than the pitch P23 and the width W14 is larger than the width W13.

Attention is focused on a relationship between the signal lines S2 and S3, and the portions BMY2 and BMY3, which are adjacent to sandwich the pixel electrode PE2. The center of the signal line S2 is displaced toward one of the sides remoter from the pixel electrode PE2 than from the center of the portion BMY2 (i.e., the side close to the pixel electrode PE1, in the example illustrated). The center of the signal line S3 is displaced toward the other side remoter from the pixel electrode PE2 than from the center of the portion BMY3 (i.e., the side close to the pixel electrode PE3, in the example illustrated). For this reason, the pitch P12 is larger than the pitch P22. In addition, the width W12 of the signal line S2 is equal to the width W13 of the signal line S3. According to this configuration example, the gap between the signal lines S2 and S3 can be made larger as compared with the configuration in which the signal lines S2 and S3 are arranged at the pitch P22 and the configuration in which at least one of the signal lines S2 and S3 has the width W11.

The advantage obtained from the first color pixel can also be obtained from the pixel comprising the pixel electrode PE1. In addition, in the ON state in which the electric field is formed between the pixel electrode PE1 and the common electrode CE, a region modulated by the electric field, of the liquid crystal layer LC, expands to the region overlapping the portions BMY1 and BMY2 since both the end portions of the pixel electrode PE1 are close to the portions BMY1 and BMY2 of the light-shielding layer BM. For this reason, since the region overlapping the portions BMY1 and BMY2 is blocked at the first color pixel at an oblique observation angle, an amount of the light transmitted through the second substrate SUB2 can be reduced and the color component contributing to the display can be reduced. The advantage obtained from the pixel electrode PE2 can also be obtained from the pixel electrode PE3.

The advantage obtained from the second color pixel can also be obtained from the pixel electrode PE2. In addition, since both the end portions of the pixel electrode PE2 are remote from the portions BMY2 and BMY3 of the light-shielding layer BM, a region modulated by the electric field, of the liquid crystal layer LC, is formed at the central part between the portions BMY2 and BMY3 in the ON state. For this reason, the modulated region can hardly be blocked by the portions BMY1 and BMY2 at an oblique observation angle, the amount of the light transmitted through the second substrate SUB2 can be increased and the color component contributing to the display can be increased. Deterioration in display quality at the oblique observation angle can be therefore suppressed.

Figure 9:
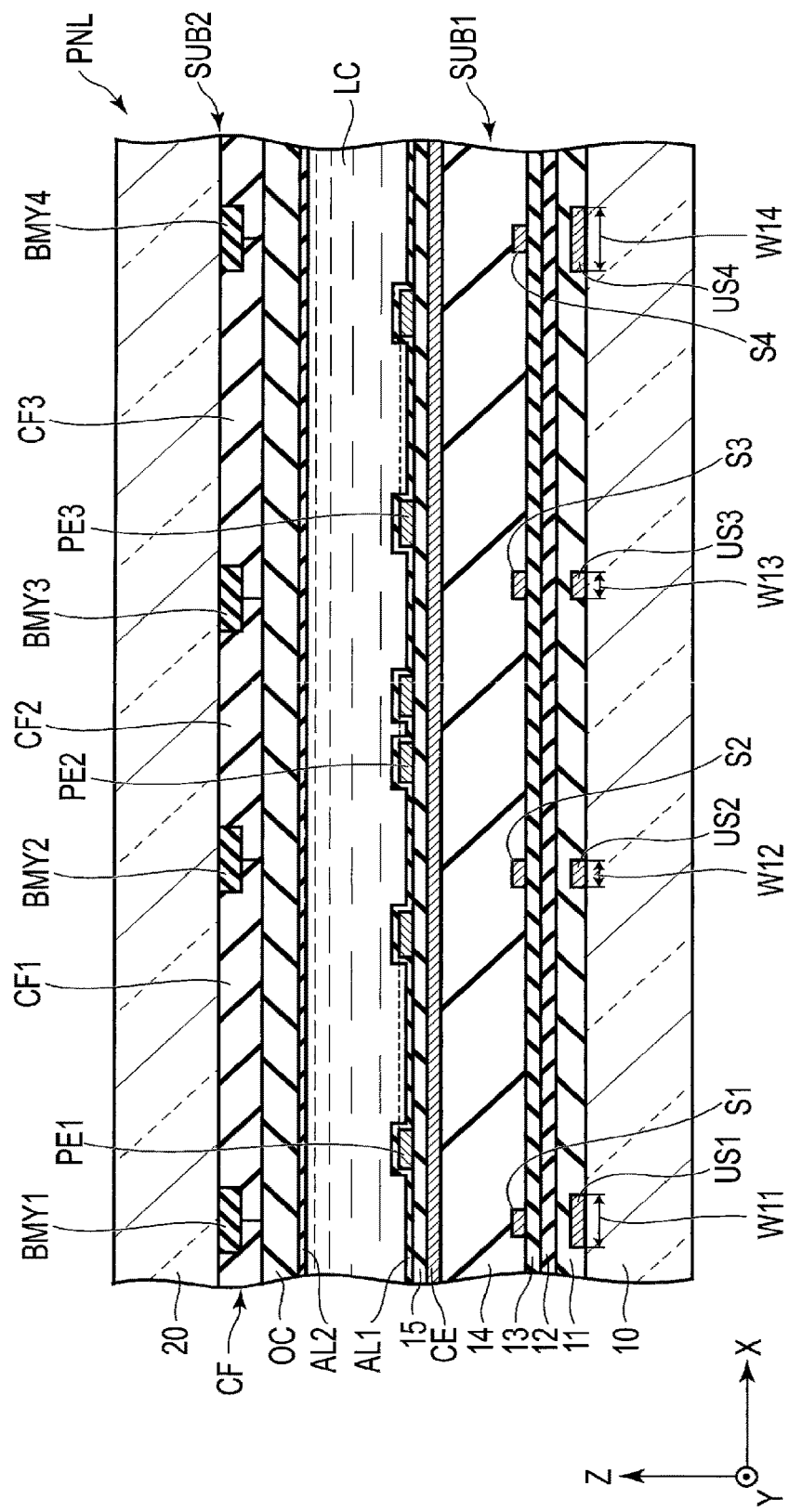
FIG. 9 is a cross-sectional view showing another configuration example of the display panel PNL.

FIG. 9 is a cross-sectional view showing another configuration example of the display panel PNL. The configuration example shown in FIG. 9 is different from the configuration example in FIG. 8 with respect to a feature that the lower light-shielding layers US1 to US4 function as the light-shielding layers SL1 to SL4, respectively. The same constituent elements as those of the above-explained configuration example are denoted by like reference numerals and their detailed explanations are omitted. In addition, a layout of the lower light-shielding layers US1 to US4 in the X-Y plane may be the same as that of the signal lines S1 to S4 shown in FIG. 7 and its detailed explanations are omitted.

The lower light-shielding layers US1 to US4 are located on the first insulating substrate 10 and are covered with the first insulating film 11. As explained with reference to FIG. 6, the semiconductor layer SC is located between the first insulating film 11 and the second insulating film 12, and the lower light-shielding layers US1 to US4 are located between the first insulating substrate 10 and the semiconductor layer SC. The lower light-shielding layers US1 to US4 are arranged in the first direction X and spaced apart from each other. The lower light-shielding layers US1 to US4 may be set at a predetermined potential or may be electrically floating. The lower light-shielding layers US1 and US4 have equal widths W11 and W14, respectively. The lower light-shielding layers US2 and US3 have equal widths W12 and W13, respectively. The widths W11 and W14 are larger than the widths W12 and W13.

The signal lines S1 to S4 are located just above the lower light-shielding layers US1 to US4, respectively. The signal lines S1 to S4 have equal widths in the example illustrated but may have widths equal to the widths of the lower light-shielding layers disposed just under the signal lines.

The portions BMY1 to BMY4 of the light-shielding layer BM are located just above the lower light-shielding layers US1 to US4, respectively. More specifically, the lower light-shielding layer US1 is substantially located in the center of a region overlapping the portion BMY1. The lower light-shielding layer US4 is substantially located in the center of a region overlapping the portion BMY4. The lower light-shielding layer US3 is located on the side closer to the lower light-shielding layer US1 than to the central part (or the side remote from the lower light-shielding layer US3), of the region overlapping the portion BMY2. The lower light-shielding layer US3 is located on the side closer to the lower light-shielding layer US4 than to the central part (or the side remote from the lower light-shielding layer US2), of the region overlapping the portion BMY3.

In this configuration example, too, the same advantages as those of the configuration example shown in FIG. 7 and FIG. 8 can be obtained. In addition, the lower light-shielding layers US1 to US4 can be arbitrarily formed in a freely selected shape without electric restriction and can easily implement the required light-shielding property. Since the light-shielding layers SL1 to SL4 are the lower light-shielding layers US1 to US4 located at positions lower than the signal lines S1 to S4, the light-shielding property required to the small widths (or small installation areas) can be implemented as compared with the configuration example in which the light-shielding layers SL1 to SL4 are the signal lines S1 to S4.

Figure 10:
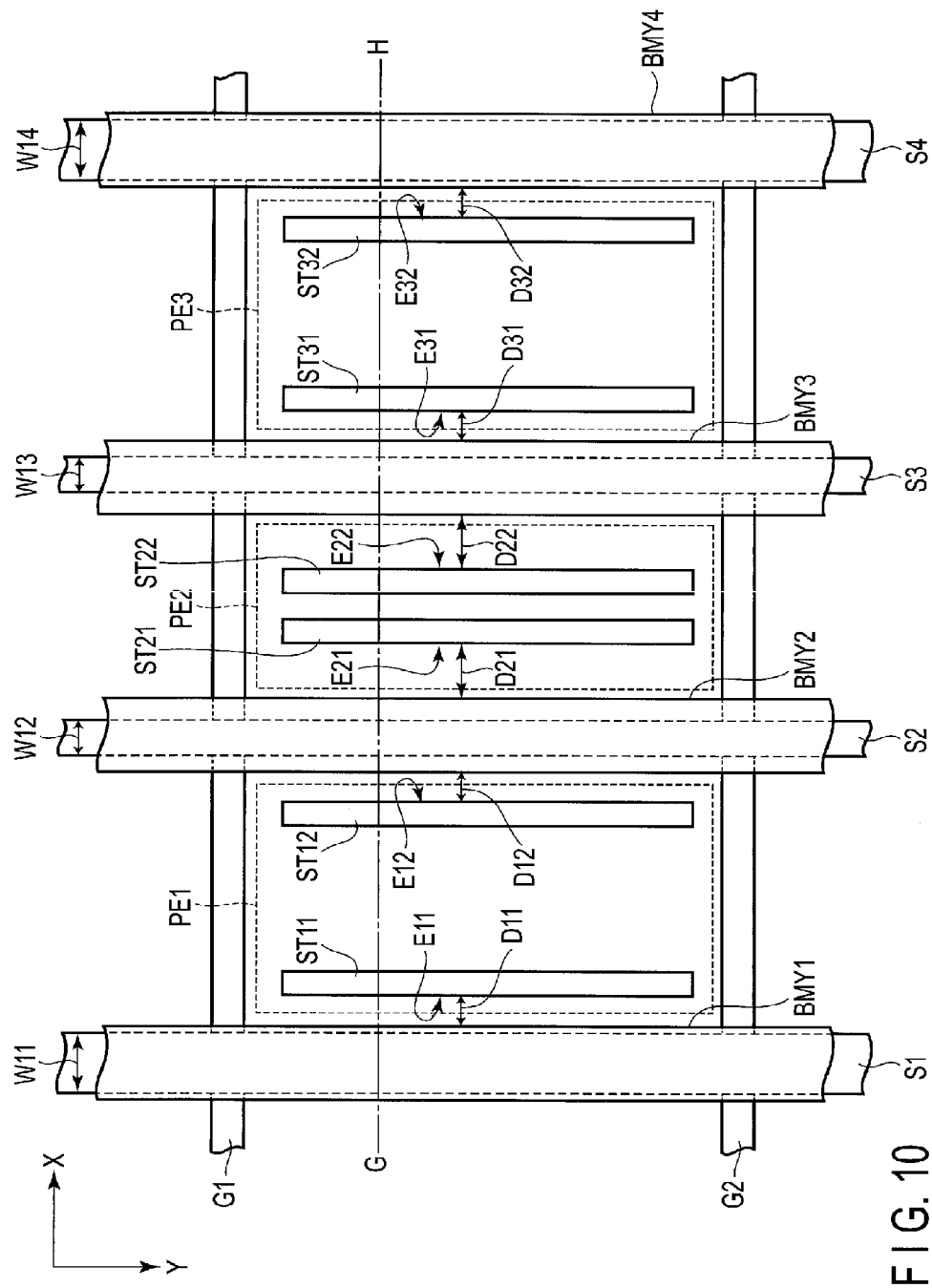
FIG. 10 is a plan view showing another configuration example of the major portions of the first substrate and the light-shielding layer BM of the second substrate.

FIG. 10 is a plan view showing another configuration example of the major portions of the first substrate and the light-shielding layer BM of the second substrate. A portion of the light-shielding layer BM extending in the first direction X is not illustrated in the figure. The light-shielding layers SL1 to SL4 are the signal lines S1 to S4 in the figure, and the layout of the signal lines S1 to S4 and the portions BMY1 to BMY4 of the light-shielding layer BM has been explained with reference to FIG. 7 and is not explained here.

The configuration example shown in FIG. 10 is different from the configuration example in FIG. 7 with respect to features that the pixel electrodes PE1 to PE3 are formed in a planar shape and that a common electrode includes slits overlapping the pixel electrodes PE1 to PE3. Illustration of the common electrode is omitted and the slits alone are illustrated in the figure.

The pixel electrode PE1 is located between the portions BMY1 and BMY2 or between the signal lines S1 and S2. The pixel electrode PE2 is located between the portions BMY2 and BMY3 or between the signal lines S2 and S3. The pixel electrode PE3 is located between the portions BMY3 and BMY4 or between the signal lines S3 and S4. The number of slits overlapping each of the pixel electrodes PE1 to PE3 is the same and two in the example illustrated. Slits ST11 and ST12 overlap the pixel electrode PE1, slits ST21 and ST22 overlap the pixel electrode PE2, and slits ST31 and ST32 overlap the pixel electrode PE3. A pitch between the slits ST11 and ST12 is equal to a pitch between the slits ST31 and ST32 and larger than a slit between the slits ST21 and ST22.

A distance D11 between the portion BMY1 and an end portion E11 of the slit ST11 is equal to a distance D12 between the portion BMY2 and an end portion E12 of the slit ST12. A distance D21 between the portion BMY2 and an end portion E21 of the slit ST21 is equal to a distance D22 between the portion BMY2 and an end portion E22 of the slit ST22. However, the distances D11 and D12 are smaller than the distances D21 and D22. A distance D31 between the portion BMY3 and an end portion E31 of the slit ST31 is equal to a distance D32 between the portion BMY4 and an end portion E32 of the slit ST32. The distances D31 and D32 are equal to the distances D11 and D12.

FIG. 11 is a cross-sectional view showing the display panel PNL sectioned in line G-H of FIG. 10. In the first substrate SUB1, the pixel electrodes PE1 to PE3 are located on the forth insulating film 14 and covered with the fifth insulating film 15. The common electrode CE is located on the fifth insulating film 15 and covered with the first alignment film AL1. The slits ST11 and ST12 are located just above the pixel electrode PE1, the slits ST21 and ST22 are located just above the pixel electrode PE2, and the slits ST31 and ST32 are located just above the pixel electrode PE3.

Since the signal lines S1 to S4 function as the light-shielding portions SL1 to SL4, similarly to the case explained with reference to FIG. 8, the same advantage as that of the first color pixel can be obtained from the pixel comprising the pixel electrodes PE1 to PE3 and the same advantage as that of the second color pixel can be obtained from the pixel comprising the pixel electrode PE2.

The light-shielding portions SL1 to SL4 are the signal lines S1 to S4 in the configuration example shown in FIG. 10 and FIG. 11, but the light-shielding portions SL1 to SL4 may be the lower light-shielding layers US1 to US4.

In addition, the light-shielding portion SL is formed not only on the third insulating film 13 or under the semiconductor layer SC, but may also be formed on, for example, the fourth insulating film 14 or the second insulating film 12.

In a case where the light-shielding portion SL is formed on the fourth insulating film 14, the light-shielding portion SL may be in contact with the common electrode CE while overlapping the portion BMY, in the structure shown in, for example, FIG. 6. In this case, the light-shielding portion SL may be overlaid on the common electrode CE or the common electrode CE may be overlaid on the light-shielding portion SL. The light-shielding portion SL may have the same electric potential as the common electrode CE in this case.

In a case where the light-shielding portion SL is formed on the second insulating film 12, the light-shielding portion SL is disposed to be out of contact with the scanning line G while overlapping the portion BMY since the light-shielding portion SL is located in the same layer as the scanning line G. In this case, the light-shielding portion SL may be electrically floating or have a fixed potential (for example, the ground potential).

Furthermore, the third insulating film 13 may be formed in two layers, in the first substrate SUB1. In this case, the light-shielding portion SL may be formed between two layers of the third insulating film 13 while overlapping the portion BMY.

As explained above, the display device capable of suppressing the deterioration in display quality can be provided by the present embodiments.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A display device, comprising:
a first substrate including a first light-shielding portion and a second light-shielding portion arranged at a first pitch in a first direction; and
a second substrate including a light-shielding layer including a first portion overlapping the first light-shielding portion and a second portion overlapping the second light-shielding portion in planar view,
a width center of the second light-shielding portion being displaced from a width center of the second portion in the first direction,
an opening portion being located between the first portion and the second portion,
the first portion and the second portion being arranged at a second pitch different from the first pitch in the first direction.

2. The display device of claim 1, wherein
a width center of the first light-shielding portion matches a width center of the first portion, and the width center of the second light-shielding portion is closer to the opening portion than to the width center of the second portion, and
the first pitch is smaller than the second pitch.

3. The display device of claim 2, wherein
a first width of the first light-shielding portion is larger than a second width of the second light-shielding portion.

4. The display device of claim 3, wherein
the first portion and the second portion have an equal third width, and
the third width is larger than the first width and the second width.

5. The display device of claim 4, wherein
when the second width of the second light-shielding portion is represented by W2 and the third width of the second portion is represented by W3, an amount of displacement between the width center of the second light-shielding portion and the width center of the second portion is (W3−W2)/2 or less.

6. The display device of claim 4, wherein
an entire body of the second light-shielding portion overlaps the second portion in planar view.

7. The display device of claim 1, wherein
the width center of the first light-shielding portion is remoter from the opening portion than from the width center of the first portion, toward one of sides,
the width center of the second light-shielding portion is remoter from the opening portion than from the width center of the second portion, toward the other side, and
the first pitch is larger than the second pitch.

8. The display device of claim 7, wherein
a first width of the first light-shielding portion is equal to a second width of the second light-shielding portion.

9. The display device of claim 8, wherein
the first portion and the second portion have an equal third width, and
the third width is larger than the first width and the second width.

10. The display device of claim 9, wherein
when the second width of the second light-shielding portion is represented by W2 and the third width of the second portion is represented by W3, an amount of displacement between the width center of the second light-shielding portion and the width center of the second portion is (W3−W2)/2 or less.

11. The display device of claim 9, wherein
an entire body of the first light-shielding portion overlaps the first portion and an entire body of the second light-shielding portion overlaps the second portion, in planar view.

12. The display device of claim 1, wherein
the first substrate further includes an insulating substrate and a semiconductor layer, and
the first light-shielding portion and the second light-shielding portion are located between the insulating substrate and the semiconductor layer or between the semiconductor layer and the second substrate.

13. A display device, comprising:
a first substrate including first to third light-shielding portions arranged sequentially in a first direction; and
a second substrate including a light-shielding layer including a first portion overlapping the first light-shielding portion, a second portion overlapping the second light-shielding portion and a third portion overlapping the third light-shielding portion, in planar view,
the first light-shielding portion and the second light-shielding portion being arranged at a first pitch,
the first portion and the second portion being arranged at a second pitch larger than the first pitch,
the second light-shielding portion and the third light-shielding portion being arranged at a third pitch,
the second portion and the third portion being arranged at a fourth pitch smaller than the third pitch.

14. The display device of claim 13, further comprising:
a first opening portion located between the first portion and the second portion,
wherein
a width center of the first light-shielding portion matches a width center of the first portion, and a width center of the second light-shielding portion is closer to the first opening portion than to a width center of the second portion.

15. The display device of claim 14, wherein
an entire body of the first light-shielding portion overlaps the first portion and an entire body of the second light-shielding portion overlaps the second portion, in planar view.

16. The display device of claim 13, further comprising:
a second opening portion located between the second portion and the third portion,
wherein
a width center of the second light-shielding portion is remoter from the second opening portion than from a width center of the second portion, toward one of sides, and
a width center of the third light-shielding portion is remoter from the second opening portion than from a width center of the third portion, toward the other side.

17. The display device of claim 16, wherein
an entire body of the second light-shielding portion overlaps the second portion and an entire body of the third light-shielding portion overlaps the third portion, in planar view.

18. The display device of claim 13, wherein
the fourth pitch is smaller than the second pitch.

19. The display device of claim 13, wherein
the first substrate further includes an interlayer insulating film located above the first to third light-shielding portions, and a first pixel electrode and a second pixel electrode located above the interlayer insulating film, the first pixel electrode is located between the first portion and the second portion and a second pixel electrode is located between the second portion and the third portion, in planar view, and
a distance between the second portion and a first end portion of the first pixel electrode is shorter than a distance between the second portion and a second end portion of the second pixel electrode.

20. The display device of claim 13, wherein
the first substrate further includes a first interlayer insulating film located above the first to third light-shielding portions, a first pixel electrode and a second pixel electrode located above the first interlayer insulating film, a second interlayer insulating film located above the first pixel electrode and the second pixel electrode, and a common electrode located above the second interlayer insulating film,
the common electrode comprises a first slit opposed to the first pixel electrode and a second slit opposed to the second pixel electrode,
the first pixel electrode is located between the first portion and the second portion and the second pixel electrode is located between the second portion and the third portion, in planar view, and
a distance between the second portion and a first end portion of the first slit is shorter than a distance between the second portion and a second end portion of the second slit.

* * * * *